(12) United States Patent
Hukelmann

(10) Patent No.: US 10,794,526 B2
(45) Date of Patent: Oct. 6, 2020

(54) SOUND ABSORBER FOR VACUUM GRIPPERS

(71) Applicant: DEUTSCHES INSTITUT FUR LEBENSMITTELTECHNIK E.V., Quakenbrueck (DE)

(72) Inventor: Bernhard Hukelmann, Quakenbrueck (DE)

(73) Assignee: DEUTSCHES INSTITUT FUR LEBENSMITTELTECHNIK E.V., Quackenbrueck (DE)

(*) Notice: Subject to any disclaimer, the term of this patent is extended or adjusted under 35 U.S.C. 154(b) by 566 days.

(21) Appl. No.: 15/541,014

(22) PCT Filed: Jan. 21, 2016

(86) PCT No.: PCT/EP2016/051254
§ 371 (c)(1),
(2) Date: Nov. 3, 2017

(87) PCT Pub. No.: WO2016/116572
PCT Pub. Date: Jul. 28, 2016

(65) Prior Publication Data
US 2018/0058619 A1 Mar. 1, 2018

(30) Foreign Application Priority Data
Jan. 21, 2015 (DE) .................. 10 2015 200 966

(51) Int. Cl.
*F16L 55/033* (2006.01)
*F16L 55/052* (2006.01)
*B25J 15/06* (2006.01)

(52) U.S. Cl.
CPC ....... *F16L 55/0338* (2013.01); *B25J 15/0616* (2013.01); *F16L 55/052* (2013.01)

(58) Field of Classification Search
CPC ... F16L 55/0338; F16L 55/052; B25J 15/0616
(Continued)

(56) References Cited

U.S. PATENT DOCUMENTS

| 2,675,823 A | 4/1954 | Langdon |
| 2,893,434 A | 7/1959 | Ballard et al. |

(Continued)

FOREIGN PATENT DOCUMENTS

| DE | 247884 C | 6/1912 |
| DE | 886249 C | 8/1953 |

(Continued)

OTHER PUBLICATIONS

Ikonen, Tuija, "Notification of Transmittal of the International Search Report and the Written Opinion of the International Searching Authority, or the Declaration", Patent Cooperation Treaty Application No. PCT/EP2016/051254, European Patent Office as International Searching Authority, International Search Completed Mar. 23, 2016, International Search Report dated Apr. 7, 2016, (12 pages).

(Continued)

*Primary Examiner* — Jeremy A Luks
(74) *Attorney, Agent, or Firm* — Steven P. Fallon; Greer, Burns & Crain, Ltd.

(57) ABSTRACT

The invention relates to a sound absorber comprising a housing with an inlet for connection with the exhaust gas line of a suction gripper, the housing comprising at least one elastic segment comprising at least one though hole, and also to a process of sound absorption for a suction gripper. The application of pressurized exhaust gas to the elastic segment leads to its expansion and to enlargement of the opening of the through hole. The expansion and/or the elasticity of the elastic segment in which the through hole is arranged, and the passing of the exhaust gas through the opened through (Continued)

Figure 1:
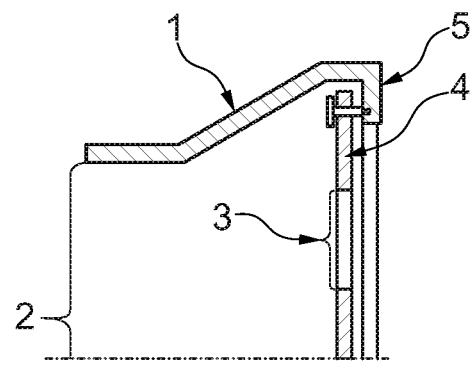

hole in the elastic segment reduce the sound emitted along with the exhaust gas.

19 Claims, 2 Drawing Sheets

(58) Field of Classification Search
 USPC ............................................ 181/230
 See application file for complete search history.

(56) References Cited

U.S. PATENT DOCUMENTS

| | | | |
|---|---|---|---|
| 3,745,285 A | | 7/1973 | Kraemer |
| 4,324,097 A | | 4/1982 | Schmitt et al. |
| 5,732,741 A | | 3/1998 | Shiery |
| 8,267,386 B2 * | 9/2012 | Schaaf | B65G 47/91 |
| | | | 269/20 |
| 8,616,602 B2 * | 12/2013 | Hukelmann | B65G 47/911 |
| | | | 294/183 |
| 2007/0210225 A1 * | 9/2007 | Carnevali | F16B 47/00 |
| | | | 248/205.8 |
| 2014/0008929 A1 * | 1/2014 | Cho | B25J 15/0616 |
| | | | 294/185 |

FOREIGN PATENT DOCUMENTS

| | | |
|---|---|---|
| DE | 2128632 B2 | 6/1971 |
| DE | 2238657 A1 | 2/1974 |
| DE | 2247884 A1 | 4/1975 |
| DE | 2803778 A1 | 8/1979 |
| DE | 202014102969 U1 | 10/2014 |
| EP | 1541856 A1 | 6/2005 |
| EP | 2415696 B1 | 8/2012 |
| FR | 2195051 A2 | 3/1974 |
| FR | 2406720 A1 | 5/1979 |
| GB | 1417256 | 6/1973 |

OTHER PUBLICATIONS

Linder, Nora, "International Preliminary Report on Patentability", Patent Cooperation Treaty Application No. PCT/EP2016/051254, European Patent Office as International Searching Authority, Report dated Jul. 25, 2017.

* cited by examiner

SOUND ABSORBER FOR VACUUM GRIPPERS

The invention relates to a sound absorber for pressurized exhaust gas, which particularly is exhaust gas of a suction gripper containing, for example, compressed air and air sucked in, and also particularly to a suction gripper comprising the sound absorber, and a process for absorbing the sound, which is emitted to the environment when pressurized exhaust gas is released. The exhaust gas preferably has a temperature of up to 70° C., e.g. 0 to 50° C.

STATE OF THE ART

EP 2415696 B1 describes a suction gripper comprising a center tube, which under compressed air supply sucks in air at a first end and lets it exit through an opposite second opening, wherein a conduit or a housing can be arranged adjacent to the second opening for sound suppression.

OBJECT OF THE INVENTION

It is an object of the invention to provide a sound absorber and a process of sound absorption for pressurized exhaust gas being released to the environment. It is a preferred object to provide a sound absorber and a process of sound absorption for a suction gripper. Preferably, the sound absorber shall have a simple construction and shall be easy to dissemble and assemble afterwards, for example for cleaning in a dishwasher.

DESCRIPTION OF THE INVENTION

The invention achieves the object by the features of the claims, particularly by a sound absorber and a process of sound absorption using the sound absorber, which has a housing with an inlet for connection with an exhaust gas line of a suction gripper, the housing having at least one elastic segment comprising at least one through hole. The elastic segment seals the housing at a distance from the inlet, the at least one through hole forming the outlet of the housing. The housing thus has an inlet for connection with the exhaust gas line of a suction gripper and at least one outlet formed by at least one through hole in the elastic segment. The elastic segment has an elasticity which upon application of pressurized exhaust gas allows an expansion and enlargement of the through hole to an opening that is larger than the opening of the through hole without application of the pressurized exhaust gas.

The at least one elastic segment covers openings of the housing, which the housing has in addition to the at least one inlet for exhaust gas or for connection with an exhaust gas line.

The elastic segment can form, for example, a section of the housing wall, only the at least one through hole of the elastic segment forming the outlet of the housing.

The elastic segment can be attached to the housing directly or in an element having at least two openings, which are sealed by one elastic segment each.

The elastic segment can consist of elastic material and cover at least one opening of the housing, the elastic segment being mounted, for example, by means of a frame that is arranged at the housing. The elastic segment can be mounted shiftably in sections or completely at the housing, or be fixed to the housing.

It turned out that at least one through hole in at least one elastic section of the element leads to an effective suppression of the sound, which is released to the environment along with the exhaust gas of a suction gripper.

The application of pressurized exhaust gas to the elastic segment leads to its expansion and to the enlargement of the opening of the through hole. It is currently assumed that the expansion and/or the elasticity of the elastic segment, in which the through hole is arranged, and the conducting the exhaust gas through the opened through hole in the elastic segment reduces the sound emitted with the exhaust gas.

Preferably, the tubular elastic segment has an elasticity, which upon application of pressurized exhaust gas allows a deformation of the through hole to a substantial larger opening than without application of the pressurized exhaust gas, for example an elasticity allowing a deformation of the outer diameter of the tubular elastic segment by the pressurized exhaust gas to at least 101%, at least 102%, at least 103%, at least 104%, at least 105%, preferably up to at least 120% of the outer diameter in the state without application of pressurized exhaust gas. Alternatively, the tubular elastic segment can have such an elasticity, that in the state of application of exhaust gas its through hole has an opening, the opposite edges of which are spaced from one another by at least 0.01 mm, at least 0.1 mm, at least 0.2 mm, or at least 0.5 mm, or are spaced from one another at least 1 mm further, as compared to the state when no exhaust gas is applied.

Without the application of pressurized exhaust gas, the at least one through hole in the elastic segment can have edges that lie against one another and, for example, be formed as at least one slit in the elastic segment. Through holes formed as a slit in the elastic segment can be arranged perpendicularly or in an angle deviating therefrom, e.g. from 30 to 90° relative to the surface of the elastic segment, rectilinear or curvy, spaced from one another and/or intersecting or overlapping. When the elastic segment is expanded by the application of pressurized exhaust gas such slit-shaped through holes form openings, through which the exhaust gas exits, wherein the sound emitted along with the exhaust gas is considerably reduced. Slit-shaped through holes can be formed, for example, as cuts crossing through the elastic segment, whereby essentially no material of the elastic segment is separated out or the material of the elastic segment is completely retained, respectively. The sound absorber preferably has slit-shaped rectilinear and/or at least in sections curved through holes and/or through holes arranged in sections at an angle with respect to each other, the edges of which are in contact with each other without application of pressurized exhaust gas, with the through holes not crossing each other.

The elastic segment preferably has a consistent thickness, e.g. from 0.5 to 8 mm, preferably 1 to 3 mm. The elastic segment optionally has a lower thickness directly adjacent to the through hole, for example in a range of from 1 to 3 mm from the edge of the through hole. A lower thickness adjacent to the through hole can be, e.g., from 30 to 70% of the thickness of the elastic segment, for example ending in an edge delimiting the through hole, which edge has a lower thickness and forms, for example, one or two opposite sealing lips around the through hole. Adjacent to the through hole, the elastic segment, for example, can taper conically towards the edges of the through hole.

Preferably, the element has at least 2, more preferably at least 3 through holes spaced from one another, which can touch each other, for example in case they are slit-shaped and their edges can touch each other without application of pressurized exhaust gas, and, further optionally, additionally can overlap each other.

Alternatively, or additionally, the at least one through hole in the elastic segment can form an opening also in the state without application of pressurized exhaust gas, for example in the form of a recess. Such a recess is likewise expanded to a larger opening when the elastic segment is expanded by the pressurized exhaust gas.

The elastic segment can be formed of single-layer or multi-layer material.

The elastic segment can be planar, for example, in the state in which no pressurized exhaust gas is applied, mounted at the housing in a flat or vault form, for example circumferentially attached with a frame encompassing its edges, in particular shiftable in sections. Alternatively, the elastic segment can be circularly closed, and, for example, be formed as a tube and attached to the housing with an opening, for example a terminal opening, additional terminal openings being closed and/or covered, for example by the housing. An elastic segment formed as a tube can comprise through holes, which are, for example, slit-shaped, for example at an angle of up to 90°, preferably of up to 75° or up to 45°, more preferably up to 30° or up to 10° relative to the longitudinal axis of the tube.

For a tubular elastic segment comprising several through holes distributed over the circumference, for example in the form of incisions approximately parallel to the longitudinal axis, it is preferred that at least one of its ends is mounted shiftably with respect to the housing to facilitate a barrel-shaped extension upon application of pressurized exhaust gas, at which the through holes expand to outlet openings. The mounting of an end of a tubular elastic segment can be effected through attachment of only one of its ends to the housing, the other end being closed and movable at least in the direction of the longitudinal axis of the tubular elastic segment, or through a shiftable mounting or guidance respectively, of the other end or of both ends at the housing. Generally, a tubular elastic segment is open at both of its ends. This is also shown in the figures. Preferably, the tubular elastic segment is mounted with both of its ends at the housing, at least one of the ends being mounted shiftably at the housing and the other end, for example, can be fixed to the housing. Preferably, both ends of the tubular elastic segment are mounted shiftably at the housing.

An advantage of the tubular elastic segment is that it comprises at each end cross-sectional openings, so that it is easy to clean after disassembly of the sound absorber, for example, is to be rinsed through completely in a dishwasher. The shiftable arrangement of the tubular elastic segment at at least one of its ends at the housing can be effected, for example, in that the elastic segment at both of its ends is encompassed by the housing and at least one end is shiftable and the other end is fixed to the housing, or is likewise encompassed by the housing in a shiftable manner. An advantage of the shiftable mounting of the tubular elastic segment at the housing is that the tubular elastic segment can blow up when pressure is applied. A further advantage of the shiftable mounting of the tubular elastic segment is that the tubular segment can easily be removed from the encompassment by the housing sections encompassing its ends, and be reinserted, for example, prior to or after a cleaning. That way, the tubular elastic segment can be easily removed from the housing sections encompassing its ends and thus from the housing, and be reinserted into these housing sections after cleaning. The housing sections encompassing the ends of the tubular elastic segment for its mounting preferably are formed cylindrically and extend only over the respective terminal section of the ends of the tubular elastic segment, for example over 1 to 10% of its total length, or each over one terminal section of the tubular elastic segment from 5 to 20, e.g. 10 to 15 mm, when no pressurized exhaust gas is applied thereto.

In the case of a tubular or circularly closed elastic segment, which can be formed, for example, by an elastic tube, the through hole has a length that is, for example, equal to 0.5 times to 2 times, preferably 1 times to 1.5 times the outer diameter of the elastic segment.

The elastic segment preferably is a rubber-elastic material and consists of, for example, an elastomer, for example on the basis of rubber, preferably synthetic rubber. The rubber-elastic material, the elastic segment is formed of, can, for example comprise or consist of polyethylene, polypropylene, polyurethane, silicone, and blends and/or copolymers thereof.

The elastic segment can be transparent, so that contaminates of the exhaust gas deposited thereon or in the housing are easily visible.

Optionally, a delimiter can be arranged at a distance or directly on the surface of the elastic segment, which faces the internal volume of the housing, or which is convexly deformed upon application of pressurized gas, which delimiter preferably crosses at least one through hole, preferably all through holes, e.g. at an angle of 30° to 90° relative to the through hole. As a result, a delimiter, which can be an elastic or a rigid delimiter, and which is arranged opposite the surface of the elastic element, inhibits, at least in the state of application of pressurized exhaust gas the deformation of the elastic segment and thus reduces the expansion of the through holes. The delimiter preferably is expansible. The delimiter serves the delimitation of the deformation of the elastic segment under the pressure of the exhaust gas, so that the maximum opening of the through hole is restricted. It turned out that a delimiter, particularly of elastic material, leads to a further reduction of sound exiting along with the exhaust gas. The delimiter can be, for example, strip-shaped. An expansible delimiter can consist of elastic material, for example of a strip of elastic material fixed to the elastic segment, which strip crosses the through hole. For a tubular elastic segment, the delimiter can be formed as an O-ring that is arranged around the elastic segment with tension. A non-elastic or rigid delimiter can be formed by a mechanical stop, which is arranged at a distance from the elastic segment in the state in which pressurized exhaust gas is not applied, the distance being measured such that when pressurized exhaust gas is applied the elastic segment bumps against the delimiter. A rigid delimiter is, for example, held by the housing.

For an easily detachable connection with the exhaust gas line of a suction gripper the sound absorber can have a recess, which encompasses a segment of a suction gripper with clamping and/or has a section, which is arrangeable between two sections of a suction gripper with clamping. The recess can be formed, for example, for encompassing in sections with clamping a carrier of the suction gripper, a supply line for compressed air and/or the center tube, which the exhaust gas streams through. A section, which preferably is an external section of the housing, can be formed, for example, to arrange the housing in sections with clamping between a carrier of the suction gripper, a supply line for compressed air and/or the center tube.

The invention will now be described in more detail by the example with reference to the figures, which schematically show in FIG. 1 a sectional view of an embodiment of the sound absorber without loading by pressurized exhaust gas, FIG. 2 a sectional view of the embodiment of FIG. 1 with loading by pressurized exhaust gas, FIG. 3 a top view of FIG. 2 rotated through 90° with loading by pressurized exhaust gas, FIG. 4 a preferred embodiment of the sound absorber in sectional view without loading by pressurized exhaust gas, and FIG. 5 the sound absorber of FIG. 4 with two alternative delimiters.

FIG. 1 shows a sectional view of a housing 1 of a device, which as a whole can be spherical or angular and comprises an inlet 2 for connection with an exhaust gas line. The outlet of the housing is formed by the at least one through hole 3, which is formed in the elastic segment 4. The elastic segment 4 is mounted by means of a frame 5, which is formed in one piece with the housing 1. For a shiftable mounting, the elastic segment 4 can have, for example, an elongated hole, through which a fastening element connected with the housing 1 or its frame 5 is guided. Therein, FIG. 1 shows the state in which no pressurized exhaust gas is applied to the housing, so that the elastic segment 4 exists in a relaxed state and the through hole 3 forms a smaller opening, as compared to the state when pressurized exhaust gas is applied to the elastic segment 4. According to a preferred embodiment, the at least one through hole 3 in the elastic segment 4 is formed as a continuous cut, so that in this state the edges of the through hole 3 lie against one another.

Figure 2:
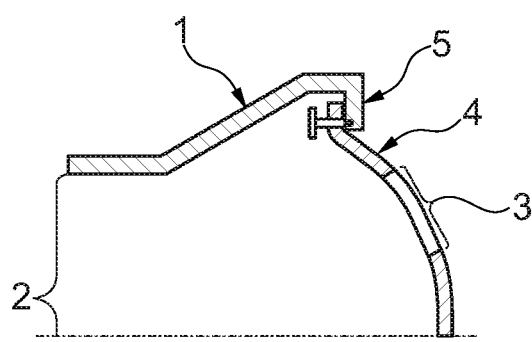

FIG. 2 shows the sound absorber of FIG. 1 in the state in which pressurized exhaust gas, which is introduced into the housing through inlet 2, is applied to the elastic segment 4. The elastic segment 4 is expanded by the pressure of the exhaust gas and the through hole 3 forms an opening greater than in the state without application of the pressurized exhaust gas.

Figure 3:
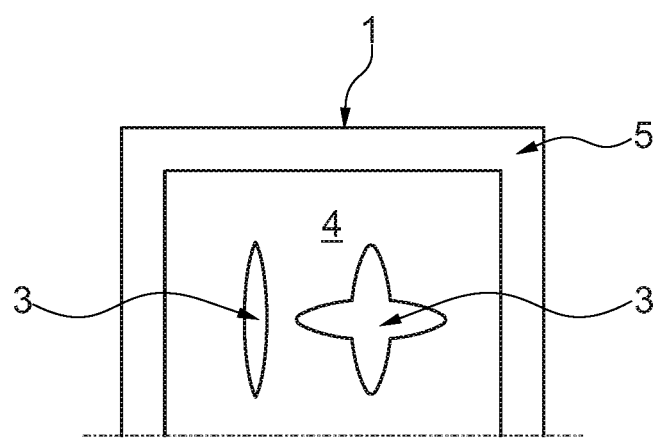

FIG. 3 shows a top view of the housing 1 and the elastic segment 4, conveying that the through holes 3a, 3b form an opening even if they are slit-shaped and their edges lie against one another without application of exhaust gas, for example, if the through holes 3a, 3b are formed by an incision going through the thickness of the elastic segment 4.

A through hole 3a is formed by a simple incision and through hole 3b by a cross-shaped incision, the edges of which lie against one another in the state without application of pressurized exhaust gas.

Figure 4:
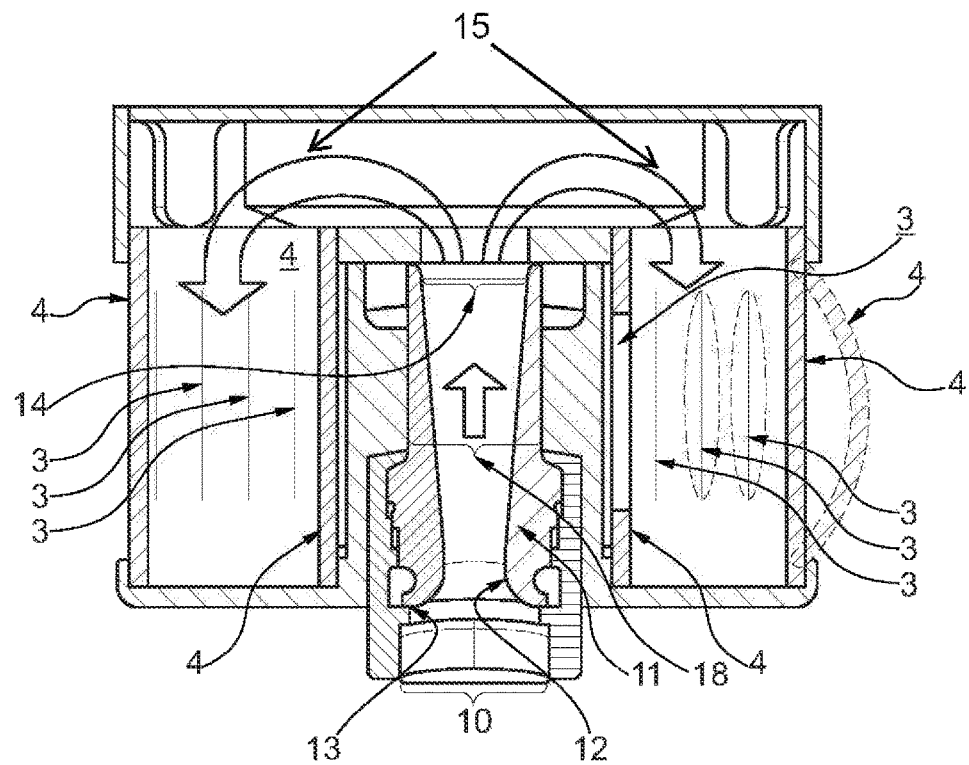

FIG. 4 shows a sectional view of a sound absorber according to the invention comprising a suction gripper, of which a suction intake 10 is shown, to which a center tube 11 is attached, the vaulted inner surface 12 of which is blown with compressed air through an opening for compressed air 13. The pressurized exhaust gas from the compressed air and air sucked in through the suction intake 10 exits from the outlet 14 connected with an exhaust gas line 15. The inlet 2 of the housing conducts the pressurized exhaust gas into a terminal opening of one of two elastic sections 4, each being formed tubularly. The elastic segments 4 are shiftably mounted in housing 1 by their ends being encompassed by a housing 1, so that these ends are shiftable and mounted in the housing 1, when the elastic segment shortens along its longitudinal axis. The shortening of the elastic segment 4 along its longitudinal axis results from the application of pressurized exhaust gas, because then the elastic section 4 expands radially and the through holes 3 form larger openings, as compared to the state when pressurized exhaust gas is not applied. The through holes 3 here are shown as incisions along the longitudinal axis of the tubular elastic segment 4, the edges of which lie against one another without application of pressurized gas. The through holes 3a in the elastic segment 4 are shown dashed in the state in which this is loaded by pressurized exhaust gas.

The suction gripper connected with the sound absorber can be, for example, one that is described in EP 2415696 B 1.

The streaming of the pressurized exhaust gas, which is, for example, composed of compressed air pressed into the center tube and the ambient air streaming in through the suction intake, is signified by the block arrows.

Figure 5:
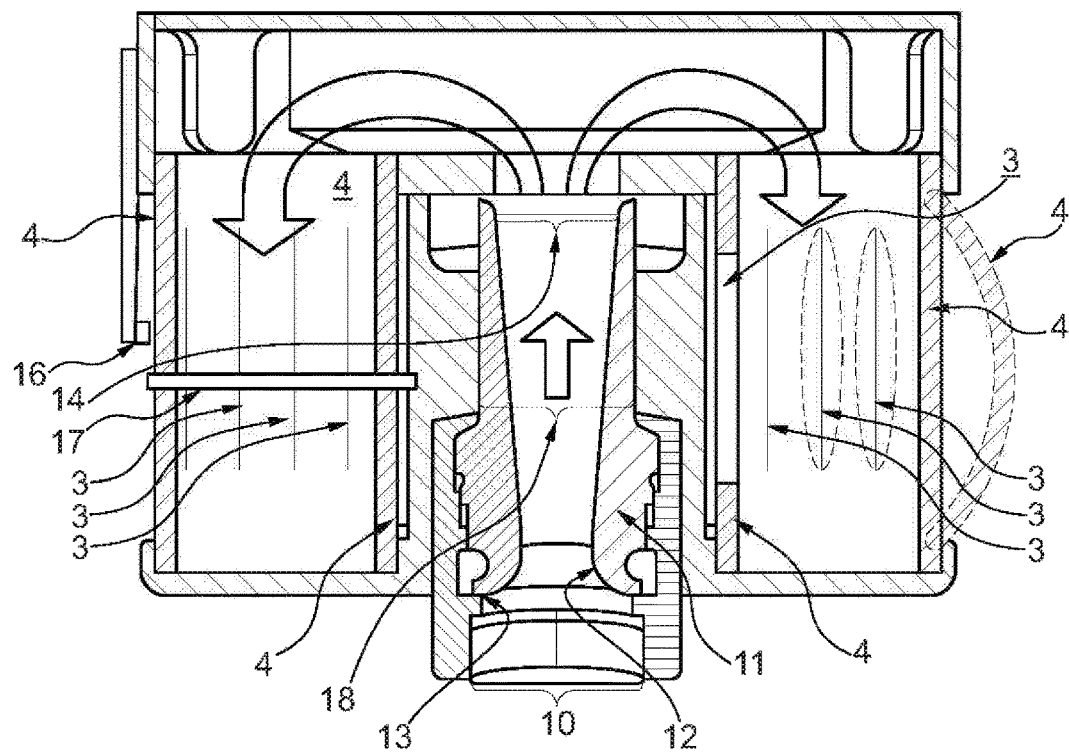

FIG. 5 shows the embodiment of FIG. 4 in which an optional delimiter 16, 17 is additionally shown for the left tubular elastic segment 4 in the state when no pressurized exhaust gas is applied. The rigid delimiter 16 is fixed at least one-sidedly to the housing 1 and is arranged in this state at a distance from the elastic segment 4, so that the elastic segment 4 can deform coming up to the rigid delimiter 16 when pressurized exhaust gas is applied and subsequently the deformation of the elastic segment 4 is inhibited by the rigid delimiter.

An elastic delimiter 17 having the form of an elastic O-ring resting in every state on the elastic segment 4 crosses the through holes 3 approximately perpendicularly to the longitudinal axis of the tubular elastic segment 4. Upon application of pressurized exhaust gas, the elastic delimiter 17 expands along with the convex deformation of the tubular elastic segment 4 and, in doing so, inhibits the opening of the through holes. It turned out that a delimiter, which is a rigid delimiter 16, preferably an elastic delimiter 17, leads to an increased absorption of the sound emitted along with the exhaust gas, in particular when the elastic segment 4 is subjected to a higher load exerted by pressurized exhaust gas.

The housing 1 is connected to a clamping recess 18, which in sections circumferentially receives the center tube 11, so that the sound absorber is connected to the suction gripper by means of this recess 18.

Example

Process of Sound Absorption

A sound absorber according to FIG. 4 comprising the suction gripper also shown there, at the suction intake 10 of which a suction cup was attached, had tubular elastic segments 4 of a tube of polyethylene having a wall thickness of 1.5 to 4 mm, in which incisions of a length equal to the outer diameter of the tube form through holes 3 along the longitudinal axis. When supplying approximately 110 l/min of compressed air, an exhaust stream of about 450 to 500 l/min air resulted, which was composed of sucked in air and compressed air. The sound was measured at a distance of about 1 m using a sound pressure measuring device. Without the sound absorber, a sound of about 87±5 dBA was measured, while employing the sound absorber, a sound of about 72±2 dBA was measured, corresponding to a reduction of sound by a factor of about 32.

LIST OF REFERENCE SIGNS 1 housing 12 vaulted inner surface
2 inlet 13 opening for compressed air
3 through hole 14 outlet
4 elastic segment 15 exhaust gas line
5 frame 16 rigid delimiter
10 suction intake 17 elastic delimiter 11 center tube 18 clamping recess
12 vaulted inner surface
13 opening for compressed air
14 outlet
15 exhaust gas line
16 rigid delimiter
17 elastic delimiter
18 clamping recess

The invention claimed is:

1. A sound absorber comprising a housing with an inlet, at least one outlet being open to the environment, which is formed by at least one through hole of at least one elastic tube of the housing, wherein the elastic tube is open at both of its ends, its terminal openings are covered by the housing and at least one of its ends is mounted shiftably at the housing, and wherein the inlet is connectable with an exhaust gas line of a suction gripper.

2. The sound absorber according to claim 1, wherein the elastic tube is mounted shiftably at both of its ends at the housing.

3. The sound absorber according to claim 1, wherein the elastic tube has an elasticity which upon application of pressurized exhaust gas allows a deformation of the through hole to a larger opening, in which the opposing edges of the through hole are more distant from each other by at least 0.01 mm, as compared to without application of pressurized exhaust gas.

4. The sound absorber according to claim 1, wherein the through hole is a slit, the edges of which without the application of pressurized exhaust gas lie against one another.

5. The sound absorber according to claim 1, wherein the through hole is a recess, the edges of which without the application of pressurized exhaust gas encompass an opening.

6. The sound absorber according claim 1, wherein the elastic tube is in contact with a frame encompassing its terminal circumferential edges, which frame is arranged at the housing.

7. The sound absorber according to claim 1, wherein the elastic tube is circularly closed and one of its terminal circumferential edges is attached to the housing.

8. The sound absorber according to claim 1, wherein the elastic tube is multilayered.

9. The sound absorber according to claim 1, wherein the housing is connected to the exhaust gas line of a suction gripper, which exhaust gas line is connected to a compressed air opening for compressed gas and a suction intake for sucking in ambient air.

10. The sound absorber according to claim 1, wherein at least one delimiter being an elastic delimiter or a rigid delimiter, is arranged opposite the surface of the elastic tube and inhibits the deformation of the elastic segment at least in the state of application of pressurized exhaust gas.

11. The sound absorber according to claim 1, wherein the housing comprises a clamping recess or an external section for a clamping arrangement at a carrier of the suction gripper, at a supply line of the suction gripper for compressed air or at a center tube of the suction gripper.

12. The sound absorber according to claim 1, wherein the through hole is slit-shaped and extends at an angle of up to 45°, relative to the longitudinal axis of the elastic tube.

13. The sound absorber according to claim 1, wherein the through hole is slit-shaped and extends over a length corresponding to 0.5 times to 2 times the outer diameter of the elastic tube.

14. The sound absorber according to claim 1, wherein the elastic tube has an elasticity allowing a deformation of an outer diameter of the tubular elastic tube to at least 101% of its outer diameter in response to application of pressurized exhaust gas, as compared to the state when the pressurized exhaust gas is not applied.

15. The sound absorber according to claim 1, wherein the through hole is slit-shaped and extends at an angle of up to 10° relative to the longitudinal axis of the elastic tube.

16. The sound absorber according to claim 1, wherein the elastic tube has an elasticity allowing a deformation of an outer diameter of the elastic tube to at least 102% of its outer diameter in response to application of pressurized exhaust gas, as compared to the state when the pressure exhaust gas is not applied.

17. A process of sound absorption of a suction gripper by application of pressurized exhaust gas of the suction gripper to a housing, the sound absorber in its housing comprising at least one elastic tube comprising at least one through hole forming the outlet of the housing and the at least one through hole upon application of pressurized exhaust gas forming a substantially larger opening, as compared to without application of pressurized exhaust gas, wherein the elastic segment is open at both of its ends, its terminal openings are covered by the housing and the elastic tube is mounted shiftably by the housing at both of its ends and upon application of exhaust gas shifts with respect to the housing.

18. The process according to claim 17, wherein the pressurized exhaust gas has a maximum temperature of 70° C.

19. The process according to claim 17, wherein the elastic tube can be removed from the housing sections encompassing its ends by moving, can be cleaned and can be arranged with its ends in said housing sections encompassing the same.

* * * * *